United States Patent
Chen et al.

(10) Patent No.: US 10,086,717 B1
(45) Date of Patent: Oct. 2, 2018

(54) ELECTRIC POWER SYSTEM FOR TRANSPORTATION

(71) Applicant: ZIPPY TECHNOLOGY CORP., New Taipei (TW)

(72) Inventors: Tsung-Chun Chen, New Taipei (TW); Yun-Chen Chen, New Taipei (TW); Edy Soeng, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/882,577

(22) Filed: Jan. 29, 2018

(51) Int. Cl.
*B60L 1/00* (2006.01)
*B60L 11/18* (2006.01)

(52) U.S. Cl.
CPC ............ *B60L 11/1851* (2013.01); *B60L 1/00* (2013.01); *B60L 2200/32* (2013.01)

(58) Field of Classification Search
CPC ..... B60L 11/1851; B60L 1/00; B60L 2200/32
See application file for complete search history.

(56) References Cited

U.S. PATENT DOCUMENTS

| | | | | |
|---|---|---|---|---|
| 5,884,469 | A * | 3/1999 | Mann | .......... D01H 11/006 57/303 |
| 2016/0222887 | A1* | 8/2016 | Bourgeois | ............ F02P 15/003 |
| 2017/0267195 | A1* | 9/2017 | Liu | ................ B60R 16/0307 |
| 2018/0018012 | A1* | 1/2018 | Konnail | ............... G06F 1/3287 |

* cited by examiner

*Primary Examiner* — Richard M Camby
(74) *Attorney, Agent, or Firm* — Muncy, Geissler, Olds & Lowe, P.C.

(57) ABSTRACT

An electric power system for transportation comprises an electric generator started up by an ignition signal, an electricity storage element and a power supply connected to the electric generator, the electricity storage element and the load. The power supply comprises a standby power supply unit, an operating power supply unit and a control unit connected to the electric generator. The control unit is provided with a first state allowing the standby power supply unit and the operating power supply unit to stop operation when the ignition signal is not detected, and a second state starting up the standby power supply unit so as to allow the standby power supply unit to supply electric power to the load and induce the load to emit an on-off signal to the operating power supply unit when the ignition signal is detected.

9 Claims, 2 Drawing Sheets

ELECTRIC POWER SYSTEM FOR TRANSPORTATION

FIELD OF THE INVENTION

The present invention is related to an electric power system for transportation, particularly to an electric power system capable of turning off a power supply of transportation when the transportation is shut down.

BACKGROUND OF THE INVENTION

With the advancement of technology, computers are introduced into recently sold transportation by many manufacturers one after another. In the case of automobiles, the conventional automobiles are not provided with complicated electronic devices, and mostly implemented by mechanical structure only. The currently sold automobiles, however, generally comprise trip computers, and equipment for vehicle state detection and so on, in such a way that electric power management is extremely essential for the current automobiles.

Furthermore, excessive electronic devices are used in the current automobiles, such that it is impossible to supply electric power only by electric generators of the automobiles, instead operating power required for each electronic device must be supplied by a power supply connected to the electric generator. The current power supply, however, mainly comprises an operating power supply unit and a standby power supply unit, in which electric power is generated by the operating power supply unit only when the power supply is started up, while electric power is supplied to the electronic devices, to which the standby power supply unit is connected, by the standby power supply unit incessantly when the power supply is situated in a standby condition. Furthermore, although the current transportation is generally provided with an electric generator and an electricity storage element, electric power is generated by the electric generator only when the transportation is started up, and electric power is also received by and then stored in the electricity storage element only when electric power is generated by the electric generator. Moreover, electricity stored in the electricity storage element is limited, and is reduced day by day until depletion if electric power is acquired by the standby power supply unit from the electricity storage element instead once the transportation is laid off. Then, there is no electric power to start up the transportation the next time inconveniently.

SUMMARY OF THE INVENTION

It is the main object of the present invention to solve the problem derived from arrangement of a power supply in transportation.

For achieving the above object, the present invention provides an electric power system for transportation, the electric power system supplying electric power to a load provided in the transportation. The electric power system comprises an electric generator, an electricity storage element and a power supply, in which the electric generator is started up to generate electric power by an ignition signal. The power supply is connected to the electric generator, the electricity storage element and the load, as well as electric power is obtained from one of the electric generator and the electricity storage element. The power supply comprises a standby power supply unit, an operating power supply unit and a control unit. The control unit is connected to the electric generator. The control unit is provided with a first state allowing both of the standby power supply unit and the operating power supply unit to stop operation when the ignition signal emitted to the electric generator is not detected, and a second state starting up the standby power supply unit so as to allow the standby power supply unit to supply electric power to the load and then induce the load to emit an on-off signal to the operating power supply unit when the ignition signal emitted to the electric generator is detected.

In one embodiment, a load-starting signal is emitted to the load from the control unit in the transformation from the first state into the second state, while a load-stopping signal is emitted to the load from the control unit in the transformation from the second state into the first state.

In one embodiment, the control unit is provided with startup buffering time data initiating a countdown once the ignition signal emitted to the electric generator is detected.

In one embodiment, the control unit is provided with shutdown buffering time data initiating a countdown once the ignition signal emitted to the electric generator is not detected.

In one embodiment, the control unit is provided with a third state starting up the standby power supply unit so as to allow the standby power supply unit to supply electric power to the load and then induce the load to emit an on-off signal to the operating power supply unit regardless of the detection of ignition signal, the electric power system being provided with a first switch, connected to the control unit and controlled to determine whether the control unit is situated in the second state or the third state to start up the standby power supply unit.

In one embodiment, the electric power system is provided with a second switch, connected to the control unit and allowed to determine whether the connection between the standby power supply unit and the electric generator and electricity storage element is switched off on the basis of a control signal emitted from the control unit.

In one embodiment, the transportation is an automobile or a ship.

In comparison with the conventional art, there are features, obtained via the disclosure of the present invention described above, as follows: the accurate control of the state of the standby power supply unit through the detection of the control unit on the ignition signal so as to avoid the problem of depletion of electricity stored in the electricity storage element due to normal consumption in the standby power supply unit occurring when the transportation is laid off.

DETAILED DESCRIPTION OF THE PREFERRED EMBODIMENTS

The detailed description and technical content of the present invention will be described, in conjunction with drawings, as follows.

Figure 1:
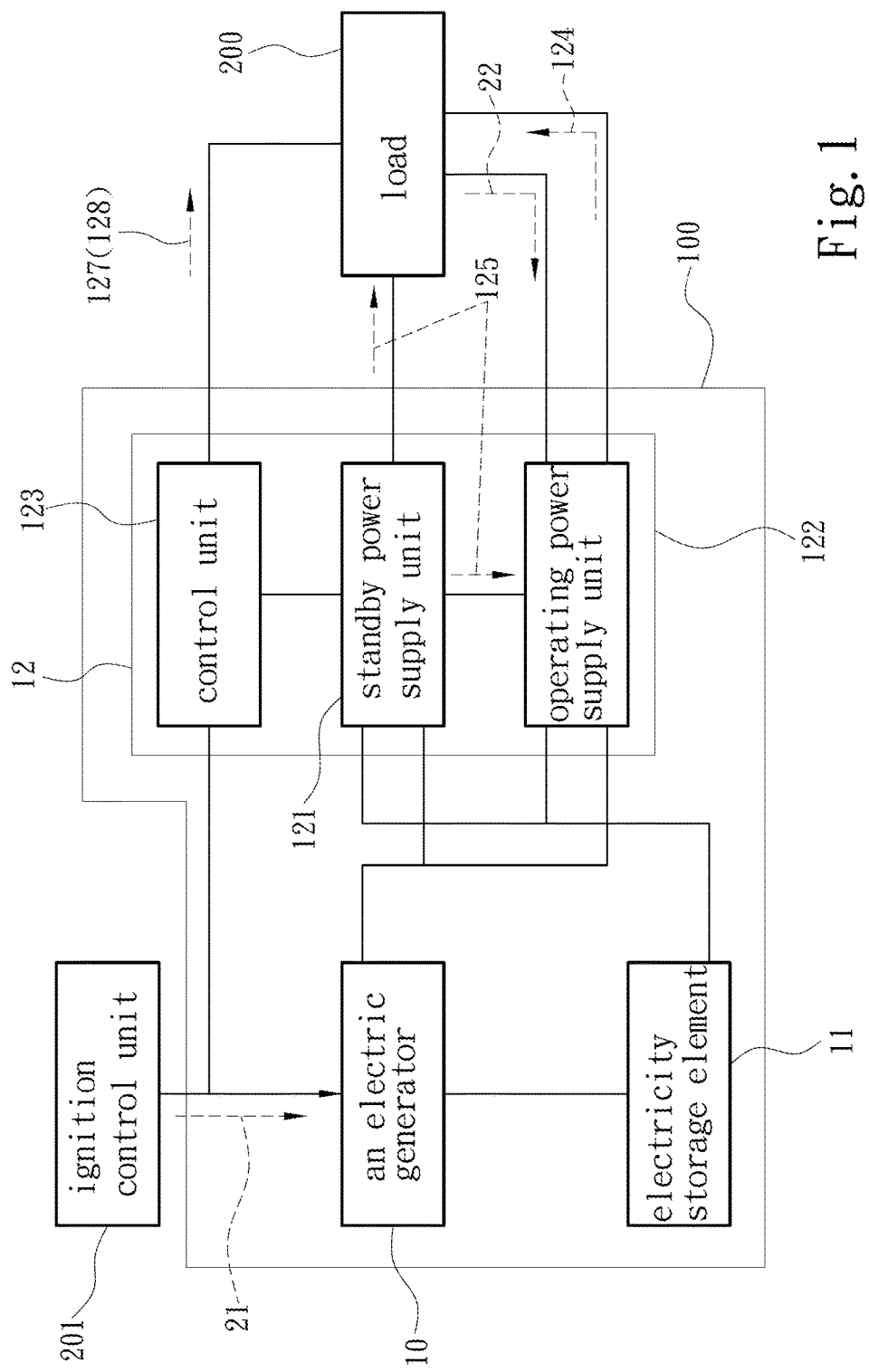
FIG. 1 is a diagram of composition of one embodiment of the present invention.

Referring to FIG. 1, the present invention provides an electric power system 100 for transportation, in which the transportation (not shown in this figure) may be an automobile or a ship. The electric power system 100 is capable of supplying electric power to a load 200 provided in the transportation. The load 200 may be an operating module, such as an automobile computer, main board and etc., for example, provided in the transportation.

The electric power system 100 comprises an electric generator 10, an electricity storage element 11 and a power supply 12, in which the electric generator 10 is started up by an ignition signal 21 and the ignition signal 21 is emitted from an ignition control unit 201 arranged in the transportation. In one embodiment, the ignition control unit 201 may be a lock of the transportation, and is capable of emitting the ignition signal 21 immediately once the lock is unlocked by a matched key. Furthermore, the electricity storage element 11 may consist of one or more batteries. Electric power generated by the electric generator 10 is received by and then stored in the electricity storage element 11 during the process of starting up the transportation. Furthermore, the power supply 12 is connected to the electric generator 10, the electricity storage element 11 and the load 200. Electric power required for the operation of the power supply 12 is obtained from one of the electric generator 10 and the electricity storage element 11. For instance, the power supply 12 may be controlled to obtain electric power from the electricity storage element 11 when the electric generator 10 is not started up yet. Further, the power supply 12 comprises a standby power supply unit 121, an operating power supply unit 122 and a control unit 123. The general functions of the standby power supply unit 121 and the operating power supply unit 122 provided for the power supply 12 of the present invention are the same as those of the power supply complying with the advanced technology extended (ATX) specification. Specifically, the operating power supply unit 122 is a primary part of the power supply 12 for supplying electric power. The operating power supply unit 122 is allowed to output operating power 124 to the load 200 after the power supply 12 is started up. Specifications of the operating power supply unit 122 may be designed in accordance with the ATX specification developed by Intel Corporation. In addition, the startup of the operating power supply unit 122 is determined on the basis of an on-off signal 22 (Ps_on) emitted from the load 200. In other words, when the on-off signal 22 indicating the startup is emitted to the operating power supply unit 122 from the load 200, the operating power supply unit 122 is started up therewith for supplying the operating power 124 to the load 200. Nevertheless, the standby power supply unit 121 is then allowed for supplying standby power 125 to the load 200. The purpose of the standby power 125 is different from that of the operating power 124. The standby power 125 is not used for the primary operation of the load 200, but used for other standby operations, for example, allowing the load 200 to emit the on-off signal 22 to the operating power supply unit 122, instead. Additionally, the standby power supply unit 121 is further connected to the operating power supply unit 122, such that the standby power 125 may be supplied to the operating power supply unit 122 by the standby power supply unit 121 after operation, so as to allow electronic components belonging to the operating power supply unit 122 to enter standby state.

In addition, the control unit 123 is connected to the standby power supply unit 121 and the operating power supply unit 122. The control unit 123 may be a logic circuit, a switch circuit or a firmware executed in an integrated circuit. Further, the control unit 123 of the present invention is determined to detect whether the ignition signal 21 is emitted to the electric generator 10. The control unit 123 is provided with a first state allowing both of the standby power supply unit 121 and the operating power supply unit 122 to stop operation when the ignition signal 21 emitted to the electric generator 10 is not detected, and a second state starting up the standby power supply unit 121 so as to allow the standby power supply unit 121 to supply electric power to the load 200 and then induce the load 200 to emit the on-off signal 22 to the operating power supply unit 122 when the ignition signal 21 emitted to the electric generator 10 is detected. In addition, a load-starting signal 128 is emitted to the load 200 from the control unit 123 in the transformation from the first state into the second state, while a load-stopping signal 127 is emitted to the load 200 from the control unit 123 in the transformation from the second state into the first state.

Next, for the specific description of the course in the implementation of the present invention, it is assumed herein that the transportation is situated in the state of transformation from the startup into the shutdown, in which the ignition control unit 201 is controlled by the driver to stop emitting the ignition signal 21 to the electric generator 10, such that the electric generator 10 is shut down from the startup. At this time, the control unit 123 is allowed to enter the first state since no ignition signal 21 is detected. At this moment, the load-stopping signal 127 is outputted from the control unit 123 to the load 200 for requesting the load 200 to shut down. Moreover, when the load-stopping signal 127 is received, the procedure, such as data backup and etc., for example, required for shutdown is performed by the load 200. After the load 200 is shut down, the control unit 123 is allowed to induce both of the standby power supply unit 121 and the operating power supply unit 122 to stop operation; that is, the power supply 12 is shut down completely. In this way, no power is consumed in the power supply 12 when the transportation is not used, so as to avoid depletion of electricity in the electricity storage element 11. In addition, the control unit 123 is provided with shutdown buffering time data initiating a countdown once the ignition signal 21 emitted to the electric generator 10 is not detected in one embodiment, so as to avoid too fast shutdown of the standby power supply unit 121 and the resulted incompletion of normal shutdown procedure of the load 200. Specifically, the shutdown buffering time data may be a parameter pre-stored in the control unit 123. The value of the shutdown buffering time data may be adjusted, on the basis of the implementation, as 10 seconds, 20 seconds and etc., without limitation herein. Further, once the ignition signal 21 is not detected by the control unit 123, a countdown of the shutdown buffering time data is initiated. The standby power supply unit 121 is not shut down until the countdown is finished, in such a way that the power supply 12 is shut down completely.

Next, if starting up the transportation is desired by the driver, the ignition signal 21 is re-emitted to the electric generator 10 from the ignition control unit 201 by the operation of the driver. When the ignition signal 21 emitted to the electric generator 10 is detected by the control unit 123, the control unit 123 is situated in the second state transformed from the first state, in which the standby power supply unit 121 is restarted up by the control unit 123, such that the standby power supply unit 121 is allowed to supply the standby power 125 to the operating power supply unit 122 and the load 200, respectively. At the same time, the load-starting signal 128 is provided for the load 200 by the control unit 123. Subsequently, parts of the function of the load 200 may be started up on the basis of the standby power 125, so as to emit the on-off signal 22 to the operating power supply unit 122 for requesting the operating power supply unit 122 to start up and then supply the operating power 124. In one embodiment, the control unit 123 is provided with startup buffering time data initiating a countdown once the ignition signal 21 emitted to the electric generator 10 is detected. More specifically, when the ignition signal 21 is detected by the control unit 123 again, the standby power supply unit 121 is not restarted up immediately by the control unit 123, instead the standby power supply unit 121 is not started up until the electric generator 10 is stable on the basis of the countdown of the startup buffering time data.

Figure 2:
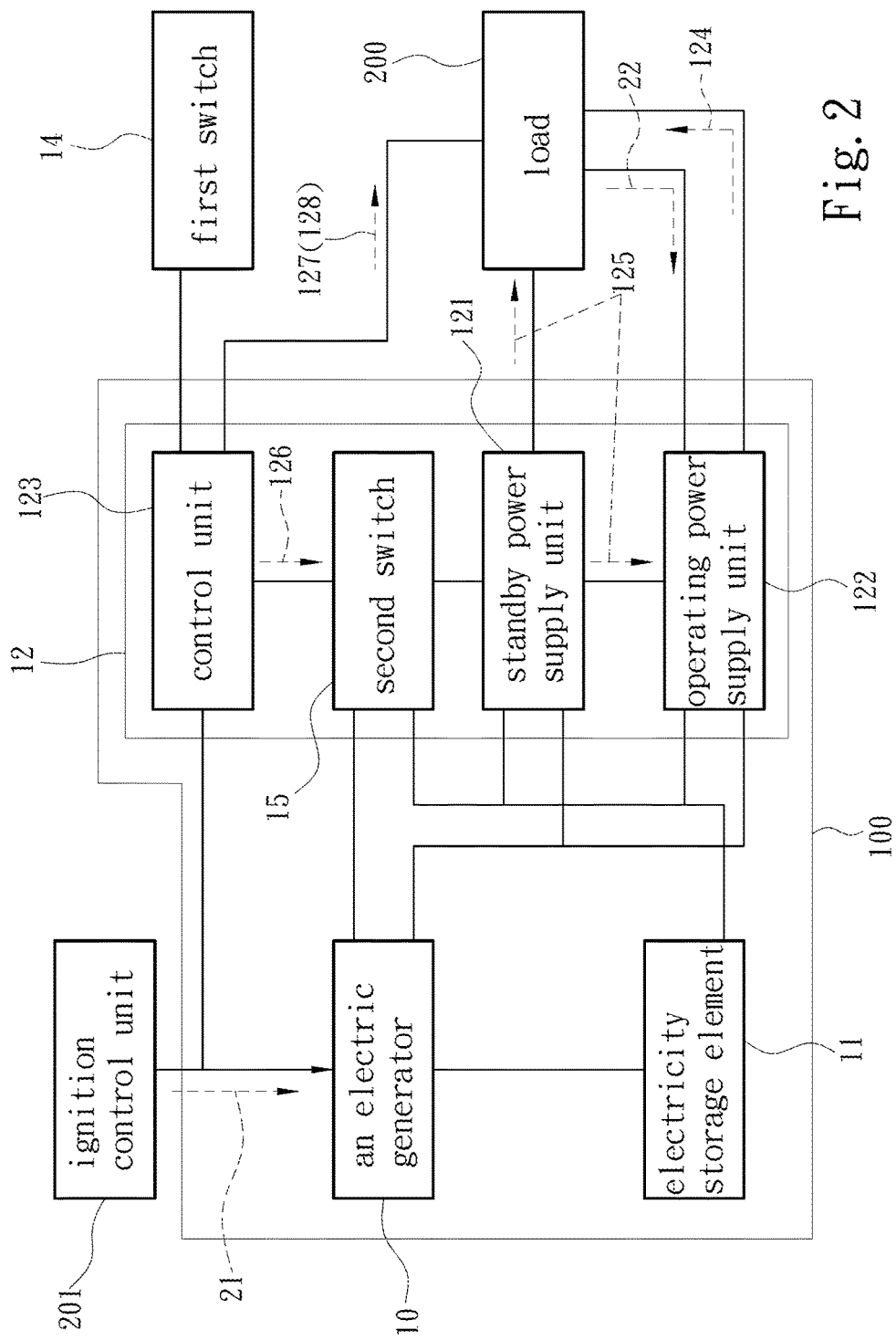
FIG. 2 is a diagram of composition of another embodiment of the present invention.

Next, referring to FIG. 2 together, it is general to start up the current smaller-sized ship by triggering the electric generator 10 directly. Thus, in one embodiment, the control unit 123 is provided with a third state starting up the standby power supply unit 121 so as to allow the standby power supply unit 121 to supply electric power to the load 200 and then induce the load 200 to emit the on-off signal 22 to the operating power supply unit 122 regardless of the detection of ignition signal 21. Further, the electric power system 100 is provided with a first switch 14, connected to the control unit 123 and controlled to determine whether the control unit 123 is situated in the second state or the third state to start up the standby power supply unit 121. The first switch 14 may be manipulated by the driver directly, so as to allow the control unit 123 entering the corresponding state. When the first switch 14 is controlled to allow the control unit 123 entering the third state, the standby power supply unit 121 may be restarted up by receiving electric power once the electric generator 10 is started up.

In one embodiment, referring to FIG. 2 again, the electric power system 100 is provided with a second switch 15, connected to the control unit 123 and allowed to determine whether the connection between the standby power supply unit 121 and the electric generator 10 and electricity storage element 11 is switched off on the basis of a control signal 126 emitted from the control unit 123. More specifically, the control signal 126 is varied on the basis of whether the control unit 123 is situated in the first state or the second state. When the control unit 123 is situated in the first state, the control signal 126 may allow the second switch 15 entering the open state, such that the standby power supply unit 121 is incapable of acquiring any electric power and then shut down, so as to achieve the object of shutting down the power supply 12 completely. Nevertheless, when the control unit 123 is situated in the second state, the control signal 126 may allow the second switch 15 entering the on-state, such that the standby power supply unit 121 is capable of acquiring electric power from one of the electric generator 10 and the electricity storage element 11 and then started up.

What is claimed is:

1. An electric power system for transportation, said electric power system supplying electric power to a load provided in said transportation, comprising:
    an electric generator, started up to generate electric power by an ignition signal;
    an electricity storage element; and
    a power supply, connected to said electric generator, said electricity storage element and said load, as well as electric power being obtained from one of said electric generator and said electricity storage element, said power supply comprising a standby power supply unit, an operating power supply unit and a control unit, said control unit being connected to said electric generator, said control unit being provided with a first state allowing both of said standby power supply unit and said operating power supply unit to stop operation when said ignition signal emitted to said electric generator is not detected, and a second state starting up said standby power supply unit so as to allow said standby power supply unit to supply electric power to said load and then induce said load to emit an on-off signal to said operating power supply unit when said ignition signal emitted to said electric generator is detected.

2. The electric power system for transportation according to claim 1, wherein a load-starting signal is emitted to said load from said control unit in the transformation from said first state into said second state, while a load-stopping signal is emitted to said load from said control unit in the transformation from said second state into said first state.

3. The electric power system for transportation according to claim 2, wherein said control unit is provided with startup buffering time data initiating a countdown once said ignition signal emitted to said electric generator is detected.

4. The electric power system for transportation according to claim 2, wherein said control unit is provided with a third state starting up said standby power supply unit so as to allow said standby power supply unit to supply electric power to said load and then induce said load to emit an on-off signal to said operating power supply unit regardless of the detection of said ignition signal, said electric power system being provided with a first switch, connected to said control unit and controlled to determine whether said control unit is situated in said second state or said third state to start up said standby power supply unit.

5. The electric power system for transportation according to claim 4, wherein said electric power system is provided with a second switch, connected to said control unit and allowed to determine whether the connection between said standby power supply unit and said electric generator and said electricity storage element is switched off on the basis of a control signal emitted from said control unit.

6. The electric power system for transportation according to claim 3, wherein said control unit is provided with shutdown buffering time data initiating a countdown once said ignition signal emitted to said electric generator is not detected.

7. The electric power system for transportation according to claim 6, wherein said control unit is provided with a third state starting up said standby power supply unit so as to allow said standby power supply unit to supply electric power to said load and then induce said load to emit an on-off signal to said operating power supply unit regardless of the detection of said ignition signal, said electric power system being provided with a first switch, connected to said control unit and controlled to determine whether said control unit is situated in said second state or said third state to start up said standby power supply unit.

8. The electric power system for transportation according to claim 7, wherein said electric power system is provided with a second switch, connected to said control unit and allowed to determine whether the connection between said standby power supply unit and said electric generator and said electricity storage element is switched off on the basis of a control signal emitted from said control unit.

9. The electric power system for transportation according to claim 1, wherein said transportation is an automobile or a ship.

\* \* \* \* \*